United States Patent [19]
Eliasson

[11] 3,834,862
[45] Sept. 10, 1974

[54] APPARATUS FOR PRODUCING PELLETS OF EXPANDED CLAY

[76] Inventor: Karl Rudolf Eliasson, Roskildevagen 17 A, S-217 46 Malmo, Sweden

[22] Filed: May 14, 1973

[21] Appl. No.: 359,830

[30] Foreign Application Priority Data
May 15, 1972 Sweden............................ 006318/72

[52] U.S. Cl.................................. 432/106, 432/11
[51] Int. Cl............................................. F27b 7/02
[58] Field of Search...................... 432/103, 106, 13

[56] References Cited
UNITED STATES PATENTS

| 999,492 | 8/1911 | Ellis | 432/106 |
|---|---|---|---|
| 1,358,761 | 11/1920 | Larsen | 432/106 |
| 1,739,383 | 12/1929 | Bauchere et al. | 432/106 |
| 2,639,269 | 5/1953 | Dube | 432/13 X |
| 3,302,937 | 2/1967 | Pixley | 432/13 |

*Primary Examiner*—John J. Camby

[57] ABSTRACT

An apparatus for producing pellets of expanded burnt clay comprises two rotary kilns, a drying kiln and a burning kiln which are arranged in such a way that they do not merge into each other centrally; the longitudinal axes thereof are offset vertically in an intermediate transition housing. The transition housing is provided with means for discharging material therefrom and supplying material thereto.

2 Claims, 2 Drawing Figures

APPARATUS FOR PRODUCING PELLETS OF EXPANDED CLAY

The present invention relates to the production of pellets of expanded clay, and an object of the invention is to improve the quality and other characteristics of the product above all by facilitating, in a practicable manner, the control of the process for producing the pellets and increasing the flexibility of such process.

Some types of clay material have the property that when heated to about 1,100°C according to predetermined relationships of time and temperature they will expand to a volume which is several times larger than the original volume thereof the clay material thereby forming more or less firm products which are well suited to be used as insulating and filling materials for example in the buidling industry. Preferably such products are produced as small porous pellets having a diameter ranging from 0 to 40 mm. These products commonly are termed lightweight aggregates.

Several different systems are used for the production of expanded clay such as sinter bands, circulation flow plants and rotary kilns. The predominating system is the method of expanding and burning the clay in rotary kilns. One of the reasons for using rotary kilns and preferably long kilns of a length exceeding 50 meters is that such kilns are reliable, provide a good heat economy, and are of a simple construction. However, they are disadvantageous due to the fact that they are in lack of flexibility as to the production for example with regard to variations in the raw material quality, which most frequently have to be considered in connection with clays that are taken more or less directly from the earth. In most cases it is tried to obtain as great an expansion of the material as possible in order to obtain thereby the largest possible volume of the final product. The product is commonly marketed according to measure by volume, the production costs however being substantially related to the production as measured by weight. Especially the types of clay available in Scandinavia have proved to be suitable in case it is desirable to obtain as low a weight by unit of volume as possible. Products having a weight by unit of volume of about 250 kg/m³ are known. On the other hand the clays available in Scandinavia have a high water content usually ranging from 30 to 60 per cent by weight of the total weight inclusive water, often 40 percent. This must be considered when choosing the method for producing expanded clay products.

When producing expanded clay by means of rotary kilns there may be distinguished between two main methods; the wet method and the dry method. Briefly, in the production according to the wet method the clay after having been homogenized in a number of mixing machines together with an expansion agent, if any, will be fed into a rotary kiln in which the material flows in a direction opposite to the direction of heat flow. In the "cool" portion of the kiln there are inserts forming banking-up means as well as heat capacity preserving means. Examples of such inserts are disclosed in the Swedish laid-open specification No. 310,469 In the warm end of the kiln the temperature may be about 1,100°C the clay expanding at that temperature. Such a kiln is disclosed in Swedish Pat. specification No. 160,405. The kiln may be divided into two portions, a drying kiln and a burning kiln, for example according to Swedish Pat. specifications Nos. 187,196 and 213,364. These patent specifications disclose kilns which are arranged axially and the drying zones of which are heated directly by the combustion products from the burning zone.

The dry method is based on the fact that the moisture content of the clay before the clay is fed into the burning kiln has been decreased considerably such that it has been possible to form thereof small pellets which are then fed into the rotary kiln where expansion and burning take place. The dry method provides a relatively good control of the production by the possibility to control for example the size of the pellets within certain limits and further by the fact that this size can be made uniform, which provides good conditions for a uniform temperature balance in the burning zone of the rotary kiln. However, this dry method does not provide the possibility to produce a fine particulate material since the pellets cannot in practice be produced with a diameter smaller than about 2 or 3 mm. The greatest disadvantage of the dry method is, however, that there does not exist today an apparatus which is able to dry clay in an economically acceptable manner from the moisture content of about 40 percent mentioned above to about 20 percent at which latter moisture content pelletizing may take place. A rotary kiln cannot be used since although it dries the clay such drying is provided in such a non-uniform manner that parts of the clay have a moisture content exceeding 30 percent while other portions may be completely dry, i.e., they have a moisture content of 0 percent. Such mixed clay cannot be pelletized. Furthermore, the apparatuses available have a low capacity only and must be used in a great number or must be made very large in order that sufficient quantities may be produced, which means high investment costs. Finally, extraordinary severe dusting problems are involved. The costs for dust protection in the apparatuses mentioned above is of the same order as the costs for the apparatuses as such due to the special character of the clays which can be used as raw material in the production of expanded clay.

Thus, the investment costs are much higher for the dry method than for the wet method. As an example it may be mentioned that the investment costs as far as buildings and machinery are concerned for a plant having a capacity of about 1,000 m³/24h are about 15,000,000 Sw.Crs. if the plant operates according to the dry method and about 10,000,000 Sw.Crs. if the plant operates according to the wet method.

Consequently, the wet method is more competitive, not least for economical reasons. Nevertheless, several plants working according to the dry method have been built and this is due to the fact that plants working according to the wet method have been subject to serious technical deficiencies. As mentioned above, the quality and moisture content of the clay vary to a comparatively large extent in most clay pits. The quality relates to the properties of the clay to yield a uniform product having a low weight per unit of volume by expansion and burning. Due to the size of the rotary kilns and the inserts provided in the "cool" part of the kiln (0° to about 600°C) such kilns are particularly badly suited to be adjusted in pace with variations in the raw material. Such variations may occur during a run of 24 hours or so. A method of meeting the variation in the raw material is to change the inserts in the kiln but for practical reasons such changes can be made only very rarely. The inserts have a weight which in most cases ranges for example from 5 to 15 tons in rotary kilns having a length of about 50 meters and a diameter of 2 or 3 meters. By means of the inserts the size of the pieces of the dried and crushed clay may be controlled to some extent. However, such control of the particle size can be performed very roughly only; for instance there may be chosen between 50 percent of the final product having a particle size exceeding 8 mm instead of 50 percent having a particle size exceeding 15 mm. To adjust the particle size more closely is not possible particularly due to the changes in the clay used as a raw material. In most cases it is impossible to obtain a material of a fine particle size. Such material has, however, an increasing range of use and may be produced according to the present invention. One object of the invention is to obtain a material of a fine particle size.

When producing according to the wet method in the conventional form as described above there is no possibility to maintain a uniform temperature balance in the rotary kiln or kilns as a whole due to the fact that the material is supplied more or less discontinuously and has a varying moisture content.

The present invention aims at overcoming in a surprisingly simple manner the problems related above when using the wet method and relates to an apparatus for producing pellets of expanded burnt clay of all sizes ranging from 0 to 40 mm by using as a raw material clay, clay slate and similar material of a type which expands and forms porous bodies when heated to temperatures exceeding 1,000°C, including a first rotary kiln sloping downwardly from a material inlet end thereof to a material outlet end thereof which is arranged as drying kiln for drying and desintegrating the material which has been supplied in a pit moisted condition together with expansion agents, if any, a second rotary kiln sloping downwardly from a material inlet end thereof to a material outlet end thereof which is arranged as a burning kiln for expanding and burning the material in temperatures exceeding 1,000°C the heat flow provided by suitable means being continuously opposed to the flow of material through the kilns, and a transition housing between the outlet end of the first kiln and the inlet end of the second kiln, characterized in that the axes of the two rotary kilns are offset vertically in relation to each other in the transition housing and that the transition housing is provided with supplying and discharging means comprising doors and slides and provided with air and material locks for the continued transfer of the heat energy dispelled from the burning kiln to the drying kiln thereby enabling a controlled transfer of material from the drying kiln to the burning kiln.

The expression "controlled transfer of material" means that the particle size of the material may be changed and that more or less different materials may be discharged from the drying kiln and simultaneously be fed into the burning kiln and, moreover, that more material may be taken from the drying kiln than is fed into the burning kiln, or vice versa. Said supplying and discharging means may have openings which are arranged in the upper or lower wall of the transition housing, in opposite vertical walls, or in one and the same vertical wall. The transfer of material in the transition housing preferably is provided by gravity. When the material has been burnt it will be cooled and then it will be carried to a storing place.

The invention makes it possible to control in a simple manner the particle size of the material which is being expanded and thus also the characteristics of the final product. Furthermore, it will be possible to utilize in a better way the capacity of the "cool" part of the rotary kiln without loosing the basic economical advantages of the main principles of the wet method. The essential feature of the present invention is thus that instead of a long rotary kiln there are provided two rotary kilns, a drying kiln and a burning kiln, which are arranged in such a way that they do not merge into each other centrally; the longitudinal axes thereof are offset vertically for example in such a manner that the lower periphery of the first kiln is at the same level as the upper periphery of the other kiln. The distance at which the axes are offset will depend on the sizes of the components involved. If the drying kiln has a diameter of 2.5 m and the burning kiln has a diameter of 3.5 m a suitable diametrical offset may be for instance about 2.5 m and the distance between the kilns may be for instance about 1.5 m. An offset arrangement of this type is previously known and is mentioned for example in the Swedish laid-open specification No. 316,716.

The transition housing comprises transport means for carrying material between the two kilns from the drying kiln to the burning kiln the heat flow having the direction from the burning kiln to the drying kiln. In this transition housing the total material discharged from the drying kiln, or a part thereof, may be discharged at one side of the transition housing or in the lower part thereof, other material at the same time being fed into the transition housing from the other side thereof or from above to be subsequently burnt and expanded in the burning kiln. The supply and discharge operations taking place in the transition housing may be separate from and independent of each other, which means that if it is desired to supply more material to the burning kiln than is discharged from the drying kiln this may be obtained as well as a supply of less material to the burning kiln than is being discharged from the drying kiln. It will be clear that the burning kiln may receive and burn material without material at all being discharged from the drying kiln, and that it is not necessary to supply material to the burning kiln, all material from the drying kiln being taken out from the transition housing. The heat losses occuring due to such transfer of the material will be held low by means of a system of material and air locks.

In dependence of the structure of the materials involved the feeding may take place from above or from one side as mentioned above by means of slides and by using locks and guide vanes. The take-out of material in that case may take place at the bottom or at one side of the transition housing by means of slides and material and air locks. In the transition housing there may be arranged in a simple manner inspection openings and, thus, the flow of material may be supervised and controlled. As will be clear from the description above it is of great importance to be able to take out material in this manner and to change the particle size thereof, for example by crushing, before the material will be supplied to the burning kiln. Only a very simple and cheap disintegrator will be necessary. There is also the possibility to arrange sieves in the transition housing, which transfer to the burning kiln only the material which is desired, the rest of the material being discharged. The costs for a complete transition housing as outlined above will be of the order 300,000 Sw.Crs. for a capacity of the kiln of 1,000 m³/24 h. If it should turn out that a simple granulating method may be adopted an enlargement of the clay material particles may be obtained.

A very important flexibility in the production of expanded clay will be obtained by the present invention. The influence of variations in the raw material may be considerably reduced. Moreover, a supply may be stored between the two kilns if it should turn out on a particular occasion that one of the kilns has a greater or smaller capacity than the other one. The possibilities to produce special products will be increased in a drastical manner due to the fact that the supply to the burning kiln can take place under full control. Also the use of a transition housing having supplying and discharging means as described above provides the possibility to install a burner in the transition housing operating towards and into the drying kiln. In this manner the temperature balance in the kiln system may be controlled and the energy consumption in the system as a whole may be utilized more effectively. In a manner which has never been possible before the invention provides in a surprisingly simple manner the possibility to produce expanded clay according to the most economical principle without the many drawbacks of this principle previously encountered, as far as the control is concerned.

Embodiments of the invention are shown in the enclosed drawing, in which.

Figure 1:
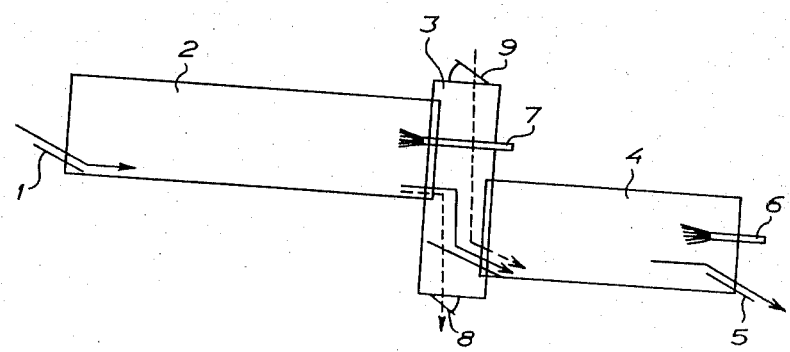
FIG. 1 is a diagrammatic side view of the apparatus.

The homogenized and probably expansion agent containing clay is fed according to FIG. 1 at 1 into a drying kiln 2. After the drying kiln 2 the material may be transferred directly through a transition housing 3 into a burning kiln 4 wherein the material will be expanded and burnt at 5. Then it will be transferred to coolers and stored. The heat is supplied substantially by a burner 6 but additional heat may also be supplied by a burner 7. To illustrate the invention there is shown a door 8 through which all material discharged from drying kiln 2 or a part thereof is allowed to fall out by gravity such that a change of the particle size of the dried clay may take place, the material then being refed into the transition housing at 9 and being fed into burning kiln 4. Material and air locks at 8 and 9, respectively, prevent surplus heat from burner 6 to dissipate from transition housing 3 such heat being transferred to drying kiln 2. This arrangement also provides the advantage for instance that a certain material may be dried in drying kiln 2, a material of a quite different type being fed into burning kiln 4 at 9. A great flexibility will thus be obtained.

Figure 2:
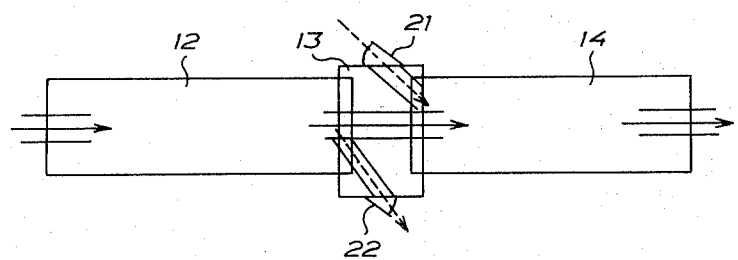
FIG. 2 is a diagrammatic plan view of a modification of the apparatus.

According to FIG. 2 the supply and discharge of material at the transition housing 13 takes place from the sides thereof. The material may be fed directly from a drying kiln 12 to a burning kiln 14 or it may be taken out from the process apparatus completely or partly by means of a slide, a lock and an opening 22 for continued treatment. As described above material may be supplied independently to burning kiln 14, from outside the apparatus, by means of a slide through a door and lock 21.

The following example is given to illustrate the influence of the size of the dried clay particles on the particle size and weight by unit of volume of the final product.

On one occasion of production the clay had the following composition:

| | |
|---|---|
| Loss due to burning | 5 % |
| $SiO_2$ | 58 % |
| $Al_2O_3$ | 18 % |
| $Fe_2O_3$ | 8 % |
| MgO | 3 % |
| CaO | 2 % |
| Residue | 6 % |

When this clay was burnt and expanded in a rotary kiln having a periphery velocity of 15 m/minute and a burning temperature of about 1,100°C the following fractions were obtained at two occasions.

PARTICLE SIZE

| | $\phi$ mm | |
|---|---|---|
| Before expansion | After expansion | Bulk density after expansion kg/m³ |
| Case I | | |
| 27 % ≤ 3 mm | 27 % ≤ 5 mm | |
| 33 % = 4 mm | 33 % = 6 mm | 300 |
| 40 % ≥ 5 mm | 40 % ≥ 7 mm | |
| Case II | | |
| 38 % ≤ 10 mm | 47 % ≤ 15 mm | |
| 47 % = 11 mm | 20 % = 16 mm | 200 |
| 15 % ≥ 12 mm | 33 % ≥ 17 mm | |

A direct connection between the size of the clay particles and the particle size of the final product will appear from the figures given above. By the invention it will be possible to control this fundamental process in producing expanded clay according to the wet method in the manner described above.

What I claim is:

1. An apparatus for producing pellets of expanded burnt clay from a composition comprising wet raw clay material which expands and forms porous bodies when heated above 1,000°C. comprising
    a. a first rotary kiln sloping downwardly from a material inlet end thereof to a material outlet end thereof, arranged as a drying kiln for drying and disintegrating said composition comprising a wet raw clay material,
    b. a second rotary kiln sloping downwardly from a material inlet end thereof to a material outlet end thereof which is arranged as a burning kiln for expanding and burning a composition comprising an expandable clay material at temperatures above 1,000°C.,
    said kilns having means for providing a heat flow continuously opposed to the flow of material through the kilns,
    c. a transition housing arranged between the outlet end of the first kiln and the inlet end of the second kiln comprising material transport means between said ends, the axes of the two kilns being offset vertically in relation to each other in the transition housing,
    said transition housing containing transfer means, discharge means, and supply means,
    said transfer means having means controllably operable to transfer material, by gravity, in whole or in part from the outlet end to the first kiln to the inlet end of the second kiln or to said discharge means, said discharge means operable to discharge material from said transition housing to the outside of the apparatus, said supply means being separate from and independently operable from said discharge means and operable to supply other material from outside the apparatus through said transition housing to the inlet end of the second kiln, said discharge means and said supply means having material locks for continued transfer of heat energy dispelled from the second kiln to the first kiln through the transition housing.

2. An apparatus, as in claim 1, wherein there is arranged in the transition housing a burner operating towards and into the drying kiln.

* * * * *